United States Patent Office

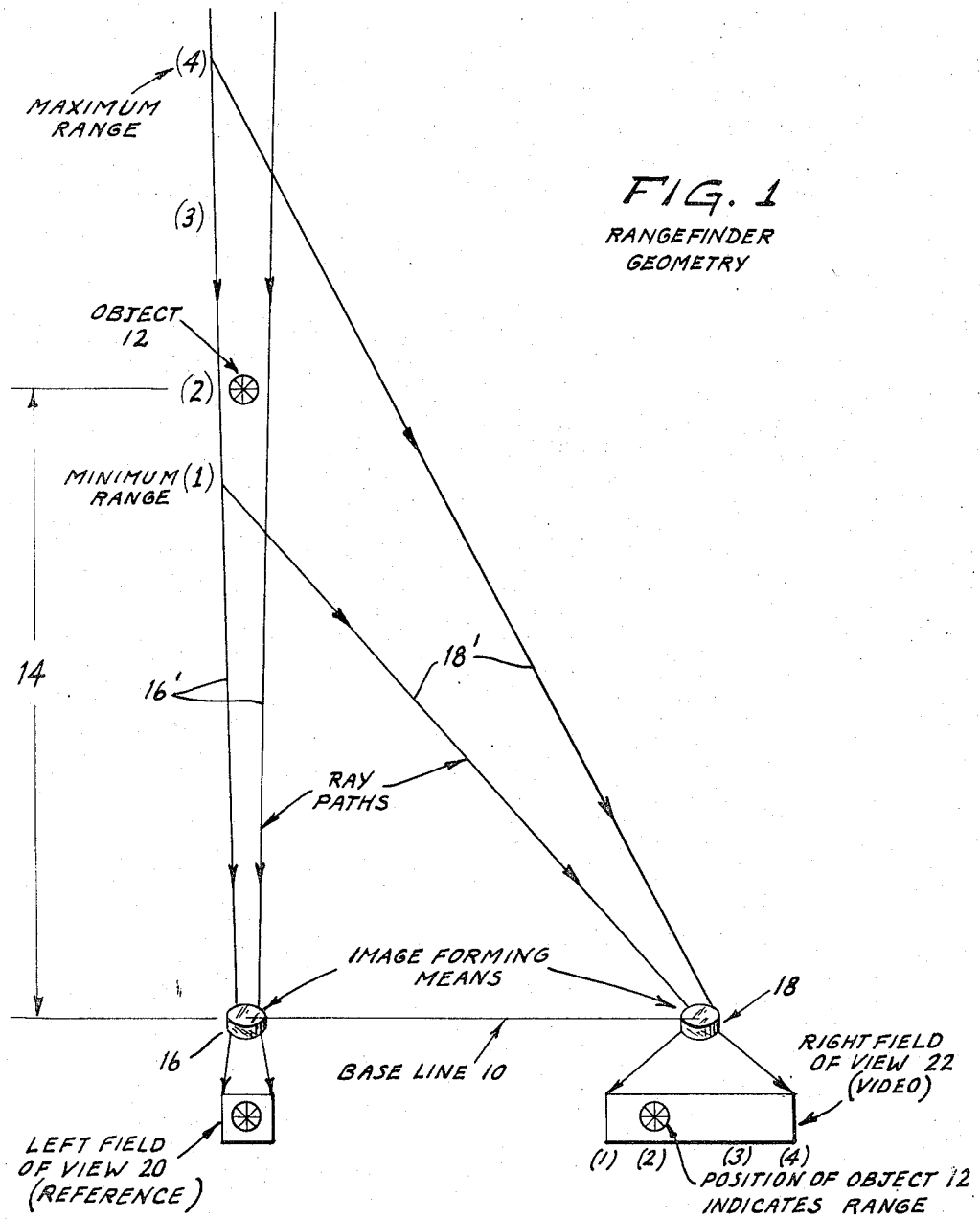

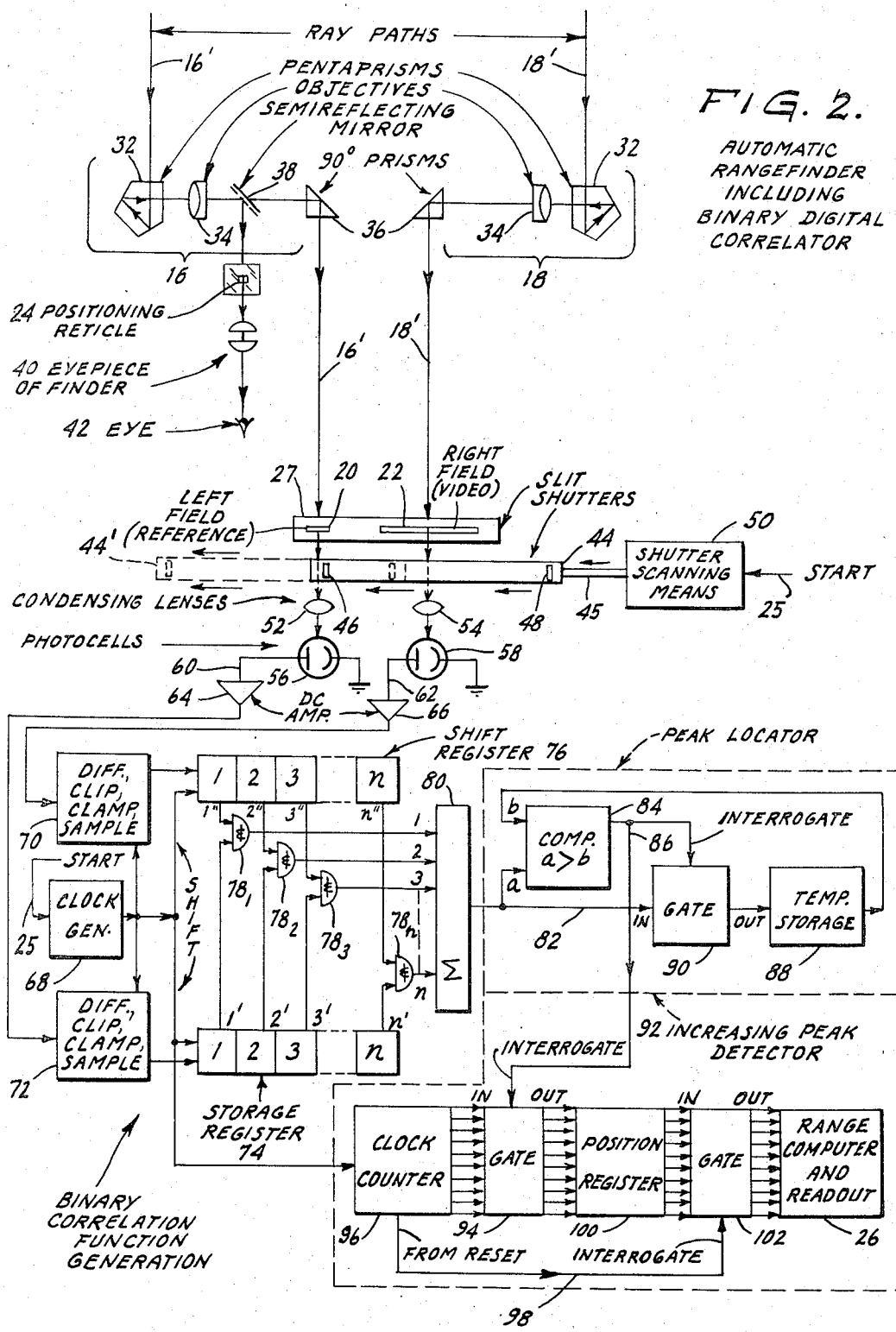

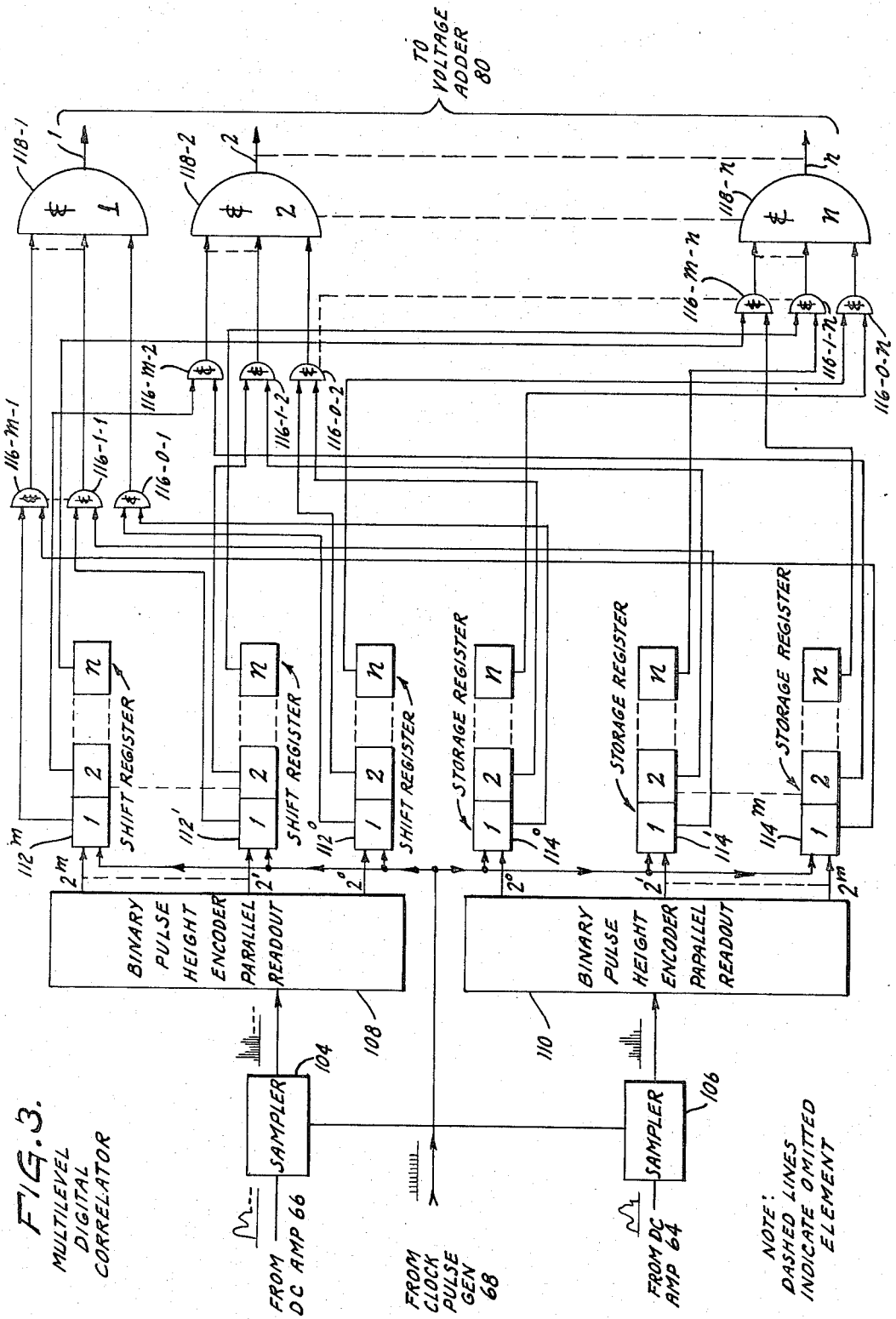

3,376,411
Patented Apr. 2, 1968

3,376,411
AUTOMATIC RANGEFINDER
Angelo Montani, Great Neck, N.Y., James H. Witt, High Point Heights, Beltsville, Md., and George Ritsi, Norristown, Pa., assignors to Philco-Ford Corporation, a corporation of Delaware
Filed July 23, 1963, Ser. No. 297,150
9 Claims. (Cl. 235—151.32)

ABSTRACT OF THE DISCLOSURE

Automatic rangefinder using crosscorrelator to compare digital signals derived from scansion of object and object plus surroundings and provide range indication according to displacement of peak in resultant correlation signal.

---

Optical instruments for measuring the range from an observer to a distant point in the observer's field of view have wide utility in commercial as well as military applications. Such instruments, known as rangefinders, have taken diverse forms, but are generally operated by an observer who sights through the instrument and performs a mechanical adjustment of a calibrated mechanism until he views a predetermined condition, such as coincidence of two images.

Although such rangefinders are instruments of precision which have high accuracy under ideal conditions it has been found that because of the manual adjustments necessarily involved, errors and inconsistencies are usually introduced into the range computation. These errors become marked under field conditions where limited time is available for the adjustments, and weather and other physical factors may distract the observer.

It would thus be desirable if means were available to obviate the necessity for manual steps in the ranging operation. Such means would free the operator, allowing his attention to be directed solely to observation of the point to be measured, and would also produce faster, more accurate, and more consistent results.

OBJECTS

Accordingly, several objects of the present invention are:

(1) To provide means for eliminating manual adjustments and corresponding human errors in range computations, (2) To provide automatic rangefinder apparatus, (3) To provide means for instantly indicating the range to a sighted object.

Other objects of the present invention are:

(4) To provide electronic cross correlation apparatus for use with an optical range finder, and (5) To provide means for determining range through digital multilevel or binary correlation.

Further objects and advantages of the present invention will become apparent to those skilled in the art from a consideration of the following description and the accompanying drawings.

SUMMARY

The automatic rangefinder of the present invention is trained on the distant object, e.g., by centering the target in the reticle of a sight. When properly trained on the target the automatic ranging function is initiated manually, as by operating a start switch. The circuit then provides an output signal which is indicative of the range to the target.

The automatic rangefinder apparatus comprises means to form a first image of the distant object (reference image) and a second image of the object plus surroundings (video image). An electrical signal (reference signal) formed by scansion of the reference image is stored in digital form, and progressively different time portions of a signal (video signal) formed by scansion of the video image are continuously compared with the reference signal for producing a third signal indicative of the degree of correlation between the two signals. This correlation signal will have a pronounced peak when the portion of the video signal representing the direct object coincides with the reference signal. The location of this peak indicates the degree of displacement from a fixed reference of the reference image in the video image, and hence the range to the distant object.

DRAWINGS

FIG. 1 depicts the geometry of the optical portion of the automatic rangefinder, FIG. 2 is a diagrammatic showing the entire automatic rangefinder including a binary digital correlator, and FIG. 3 depicts a multilevel digital correlator which may be used in lieu of the binary correlator in the system of FIG. 2.

FIG. 1—RANGEFINDER GEOMETRY

In FIG. 1 is shown the geometry of part of a typical optical rangefinder, an understanding of which will facilitate a comprehension of the instant invention.

Base line 10 represents a reference position from which the distance to the object is to be measured. The length of base line 10 has been greatly exaggerated to facilitate this explanation. The distance 14 from base line 10 to object 12 (which may be any object having a discernible outline such as a vehicle, a tree, or a building) may be several thousand times the length of base line 10, and is the unknown range to be measured.

At each end of base line 10 is an optical image forming means which has a field of view which includes object 12. Left image forming means 16 has a restricted field of view bounded by ray paths 16', while right image forming means 18 has a relatively wide field of view bounded by ray paths 18'.

The restricted field of view as seen through means 16 is indicated at 20, while the wide field of view seen through means 18 is indicated at 22. The left or reference field 20 encompasses substantially only object 12, while right video field 22 encompasses object 12 plus additional background. The limits of range encompassed by the video field are indicated by (1) for minimum range and (4) for maximum range. In practice these limits may be about 2000 yards apart, with minimum range (1) about 400 yards from base line 10. Means 18 may be adjustable and calibrated so that the limits can be changed as desired.

It will be apparent to those skilled in the art that the position of object 12 in right field 22 will change as its range 14 changes. Thus if object 12 moves closer to the base line 10 from range position (2), e.g., to position (1), its position in right field 22 would move to the left, while a movement of object 12 away from position (2) and base line 10, e.g., to positions (3) or (4), will cause its position in field 22 to move to the right. It is therefore further apparent that with proper horizontal calibration of field 22 in units of distance, beginning with the minimum range to point (1) to maximum range (4), the range to object 12 may be readily determined by ascertaining its displacement in said field.

In prior art systems the displacement of object 12 is measured by optically superimposing an image of field 20 on field 22. To accomplish this an observer would manually adjust a calibrated mechanism in order to make the two images of object 12 coincide. At coincidence the position of the calibrated mechanism will indicate the range to object 12. As explained supra, disadvantages result from the necessity for this manual adjustment to obtain coincidence. According to the present invention means are provided for automatically measuring the displacement of the image of object 12 in the field 22 from point (1). In one preferred embodiment this is accomplished by storing a first signal representative of the characteristics of the image of object 12 as seen in field 20, and then performing a calibrated scansion of a second signal representative of the characteristics of object 12 plus surroundings as seen in field 22 until the portion of the second signal corresponding to object 12 is recognized.

FIG. 2—AUTOMATIC RANGEFINDER INCLUDING BINARY DIGITAL CORRELATOR

Description

FIG. 2 shows the optical and electronic elements of the automatic rangefinder of the invention.

Optical components

All of the optical elements of the rangefinder are mounted in one housing in fixed physical relationships similar to those shown. The housing may be hand-held or tripod mounted so that its position will be adjustable. The electronic components may be housed in a separate unit which is connected to the optical housing by a cable.

The rangefinder is operated by positioning the optical housing so that a distant object whose range is to be ascertained is centered in recticle 24. The operation of the range measuring circuit is then initiated by actuating start control 25. A signal representative of the range will automatically be available a short instant thereafter at readout unit 26.

Ray paths 16' and 18', represent the correspondingly numbered rays of FIG. 1. Numerals 16 and 18 designate generally the respective image forming means discussed in conjunction with FIG. 1.

As shown in FIG. 2 each image forming means includes a pentaprism 32, an objective lens 34, and a 90° prism 36 which cause the rays represented by lines 16' and 18' to be brought closer together in well-known fashion. The objective lenses 34 may in practice be spaced about a meter apart. The rays are made to impinge on the rear of slit shutter 27 which contains narrow horizontal windows 20 and 22. Horizontal line images of the reference and video fields appear in windows 20 and 22 respectively.

Semireflecting mirror 38 is included as part of image forming means 16' to reflect a portion of the light rays from lens 28 through reticle 24 and eyepiece 40 to the eye 42 of an observer. Any other suitable means of aligning the optical axis of the eyepiece with the lefthand lens system 16 may be used in lieu of that shown. The observer in practice will position the housing of the optical mechanism so that an object is centered in reticle 24.

Behind slit shutter 27, which is permanently fixed in physical relationship with the image forming means 16 and 18, is positioned a moveable slit shutter 44 having two narrow vertical windows, 46 and 48. When the system is started, shutter scanning means 50 is arranged to move shutter 44 transversely from its present position to the phantom position indicated at 44', and then return it to its original position. Means 50 may contain an automatically reversible motor arranged to turn a worm screw engaging a rack gear on arm 45 of shutter 44. When shutter 44 is so moved, due to the positions of windows 46 and 48, window 46 will first scan the reference image through window 20, and then window 48 will scan the video image through window 22.

As window 46 scans the reference field in window 20, a point of light of varying intensity as determined by the reflective characteristics along a horizontal line on the object sighted through reticle 24 will be focused by condensing lens 52 onto photocell 56. Said photocell will provide, on lead 60, an electrical signal of varying amplitude corresponding to the varying intensity of the point of light, and hence the characteristics of a point by point scansion of a horizontal line on the sighted object. Similarly, lens 54 and photocell 58 will provide, on line 62, a signal of longer time duration whose instantaneous amplitude characteristics are representative of the point by point reflective characteristics along a horizontal line in the video field as seen in window 22. A portion of the amplitude characteristic of the video signal provided by photocell 58 will be identical to the amplitude characteristic of the reference signal provided by photocell 56, the location of this identical portion in the video signal being determined by and indicative of the distance from minimum range limit (1) in FIG. 1 to the object 12. The fixed distance from base line 10 to minimum range (1) will automatically be included in the range determination.

Electronic components (binary digital correlator)

The reference signal and video signal on lines 60 and 62 are amplified to a usable level by DC amplifiers 64 and 66, respectively, and thereafter are fed to the binary correlator shown in the lower part of FIG. 2. The electronic binary correlator functions to store the reference signal and then compare the video signal therewith to locate the portion of the video signal corresponding to the reference signal. The binary correlator may be physically separated from the rest of the rangefinder so that only the optical-mechanical components, and optionally the DC amplifiers 64 and 66, need be physically positioned by the observer. The correlator may be housed in a separate unit connected to the optical-mechanical components by a cable. Alternatively, readout means, which are shown and discussed as part of the correlator, may be physically housed within the optical-mechanical apparatus so that the observer will not have to look aside to a separate unit to obtain the range indication.

Clock pulse generator 68 in the binary correlator functions to supply clock pulses of a fixed frequency to other units in the correlator. The clock pulses serve to effect certain functional operations which will be explained in more detail later and also synchronize the various units. Clock pulse generator 68 is started by actuating control 25 which is also arranged (connection omitted) to simultaneously start the mechanical operation of shutter scanning means 50. Since shutter scanning means 50 is arranged to provide a linear forward movement and since the pulses from generator 68 are started simultaneously with means 50 and are of a fixed frequency, it will be apparent that the clock pulses are synchronized with the movement operation of shutter 44. Since the time of forward traverse of shutter 44 is fixed, generator 68 produces a fixed number of pulses for each range determination, each pulse corresponding to a different though fixed incremental position of shutter 44.

In lieu of merely starting generator 68 and shutter 44 simultaneously, synchronization can also be effected by mounting a moire fringe generator on shutter 44 and arranging a photocell to generate pulses as shutter 44 and the lines from the moire generator move transversely. Such mechanical-electrical synchronization using the moire fringe effect is more fully discussed in Patents 2,857,802 and 3,054,902. The use of this moire generator is preferred since each pulse in the generator output will correspond to a definite fixed position of the shutter despite any nonlinearities in the movement of shutter 44, whereas a simultaneously started but independently operating shutter and clock generator may not retain their initial synchronism throughout an entire operation.

Units 70 and 72 function to differentiate, clip, clamp, and sample at the clock pulse rate the reference and video signals which are supplied to their respective inputs. The reference and video waveforms will include many abrupt level transitions and slope changes corresponding to the contrast and color changes of the scanned scene. As will be apparent to those skilled in the art, differentiation, slipping, and clamping of these waveforms will produce a continuous signal of two levels (one of which may be ground or reference) with level changes corresponding to the transitions in the original waveforms. When the continuous two-level signal is sampled in units 70 and 72, in response to the signals supplied by clock pulse generator 68, a chain of equally spaced bilevel, intermittent pulses occurring at the clock pulse rate will be produced. The two levels assumed by these pulses, hereinafter referred to as bits, or ONES and ZEROES, may be convenient levels, for example, two different positive levels, two different negative levels, a positive and a negative level, or a positive or negative level and ground (reference) level. If one of the levels is ground, pulses of only one level will be produced, with a space being present where pulses of the other level would otherwise exist.

Storage register 74 receives the bits (ONES and ZEROES) from unit 72 as well as clock pulses from generator 68. The number of stages in storage register 74 is equal to the number of bits which will be supplied by unit 72 for any range determination. This number may be very large, for example one hundred or more, although only four representative stages (1, 2, 3, . . . n) are shown in FIG. 2. The number of bits will be invariant since the reference signal supplied to unit 72 is always of a constant duration due to the fixed width of window 20. The train of bits (ONES and ZEROES) from unit 72 is fed into register 74 to set the stages thereof in corresponding ONE or ZERO states. When register 74 has received the $n^{th}$ bit from unit 72 all of its stages will be set, no further clock pulses will be accepted from generator 68, and no further information shift will occur. Register 74 will store the information derived from the scansion of the reference field (window 20) and supply constant bilevel voltage indications (ONES and ZEROS) on its output lines $1', 2', 3', \ldots n'$ for the duration of a range determination.

Due to the relative positions of slits 46 and 48, Shift register 76 receives the bits from unit 70 after all the stages in storage register 74 have been set. Register 76 has the same number of stages as register 74 and otherwise operates in similar fashion thereto except that the bits it receives are continually shifted through and "out of" the register, rather than being stored when the $n^{th}$ bit is received. Since slit 22 is much longer than slit 20, unit 70 will supply several times $n$ bits to register 76, and every such bit will temporarily set every stage of register 76 once due to the continuous shift operation thereof. The outputs of stages $1'', 2'', 3'', \ldots n''$ of register 76 will provide bilevel voltages (a ONE or a ZERO) indicative of the instantaneous states of their associated stages.

AND gates 78 are each supplied with two inputs, one from an associated stage of storage register 74 and the other from the corresponding stage of shift register 76. In FIG. 2 each AND gate 78 is given a sub-number in correspondence with the number of its associated register stage, e.g., $78_1$ identifies the AND gate associated with the first stage of register 74 and the first stage of register 76. Each AND gate 78 functions to supply a fixed voltage at its output terminal, hereinafter designated a binary ONE, whenever both of its inputs receive the same type of binary bit, i.e., both receive a ONE or a ZERO.

Voltage adder 80 is supplied with $n$ inputs connected to the outputs of the $n$ AND gates 78. The magnitude of the voltage supplied on output lead 82 of adder 80 is proportional to the number of its inputs which receive binary ONES. Thus the voltage on lead 82 will always assume one of $n$ possible values.

The aforedescribed electronic units beginning with clock pulse generator 68 and units 70 and 72 together constitute a Binary Correlation Function Generator which generates a correlation signal representative of a comparison of the signals from amplifiers 64 and 66. The remaining electronic units in FIG. 2 together constitute a Peak Locator which locates the highest peak in the correlation signal in terms of units of range.

Comparator 84 in the peak locator has two inputs, $a$ and $b$, and an output lead 86. Comparator 84 provides a voltaic output on lead 86 only when the voltage of input $a$ (connected to output 82 of adder 80) is greater than that of input $b$ (connected to the output of unit 88). Comparator 84 may consist of a multiar with input $b$ used in lieu of a reference voltage.

Gate 90 is normally nontransmissive of any voltage supplied to its "IN" lead (connected to output 82 of adder 80) but when its "INTERROGATE" input is energized, its "OUT" lead will supply a voltage proportional to the voltage on its IN lead. The voltage on the OUT lead is preferably but not necessarily equal to that of the IN lead.

Unit 88 is a temporary voltage storage unit which will supply at its output a constant voltage equal to the voltage it receives from gate 90. Normally gate 90 will supply pulses to unit 88 and unit 88 will "remember" the magnitude of each pulse until a new pulse is received. If gate 90 is arranged so that its output voltage is not equal to its input voltage, but mathematically related thereto, storage unit 88 must be arranged to compensate for the change produced in gate 90. In practice gate 90 may provide attenuation and thus compensating amplification must be provided in unit 88. Comparator 84, gate 90, and storage unit 88 together constitute an Increasing Peak Detector 92 which functions to provide a pulse on lead 86 (i.e., the INTERROGATE input of gate 94) whenever, during a particular range comparison, a pulse is supplied on lead 82 which is greater than any previous pulse supplied thereon.

Clock Counter 96 is a series-to-parallel converter which converts the count of the train of pulses it receives at its input from generator 68 into a parallel binary form. Thus if 1000 pulses have been received, the parallel outputs of counter 96 will be energized in the pattern "1111101000", i.e., $$1\times2^9+1\times2^8+1\times2^7+1\times2^6+1\times2^5 +0\times2^4+1\times2^3+0\times2^2+0\times2^1+0\times2^0$$

as is well understood by those skilled in the art. Clock counter 96 is capable of counting all the pulses produced by generator 68 during a single operation, although it will be shown that the first $n$ pulses (representative of scansion of window 20) are not used. Counter 96 is arranged to automatically reset and produce a pulse on line 98 when all the pulses representative of a single operation have been generated.

Gate 94 is similar to gate 90 except that it has a plurality of corresponding inputs and outputs. When gate 94 receives an interrogate pulse from comparator 84, the ONE and ZERO voltage indications present on its input lines are supplied respectively to its corresponding output lines.

Position register 100 includes a series of flip-flops individually settable and resettable in ONE and ZERO stages corresponding to the instant binary indications on the outputs of gate 94.

Gate 102 is identical to gate 94. It receives the stored ONES and ZEROS from the outputs of the stages of register 100 and transmits them to its output lines on command of a pulse on interrogate line 98.

Range computer and readout unit 26 converts the parallel binary signals supplied at the several inputs of unit 26 into a signal which is representative of units of range. Unit 26 may be a digital to analog converter which includes a suitable initial bias representative of the minimum range (1) of FIG. 1. The range may be indicated by any suitable means, e.g., a meter, or number-indicating tubes. Unit 26 may be arranged to store the range reading only long enough to be observed or semipermanently until it is manually reset. The readout or indicating part of unit 26 advantageously may be physically placed on the optical components to facilitate reading by the operation. The rest of the binary correlator may be housed in a separate unit placed on the ground or back of the operator and connected to the optical components by a cable, as discussed.

Operation

Binary Correlation Function Generator

The Binary Correlation Function Generator, represented by elements 68 to 80, operates as follows.

When the object whose range is to be determined is centered in reticle 24, shutter scanning means 50 is actuated by manually depressing start control 25. As slit 46 sweeps past slit 20 a reference signal corresponding to the characteristics of the sighted object is generated by photocell 56 and amplified by amplifier 64.

After differentiation, clipping, and clamping in unit 72, a bilevel signal is produced with level transitions corresponding to the contrast and color boundaries of the object. This bilevel signal is then sampled at the clock pulse generator rate in unit 72, producing groups of bits which are representative of binary ONES and ZEROES. The pattern of these ONES and ZEROES is representative of the object.

These groups of bits are fed in sequence into storage register 74, through which the bits are shifted by the clock pulses. Scansion of field 20 will generate $n$ bits, which is the number of stages in register 74. Register 74 may have a counter arranged to operate an input gate or other suitable means incorporated therein so that when it has received the $n$ bits it will not accept or shift any further bits, but will supply on its $n$ output lines voltage indications representative of the states of the stages. Each of the $n$ output lines is connected to one input of one AND gate 78.

After slit 44 has scanned slit 20 and storage register 74 is filled, slit 48 will reach and scan slit 22, producing a video signal which is fed to unit 70. Part of this video signal will be identical to the reference signal since the video field encompasses the reference field.

The groups of bits representative of the video signal derived in unit 70 are stepped through shift register 76. Since the video signal is several times longer than the reference signal, several times $n$ bits will be fed through shift register 76, every bit setting or resetting every stage once. The $n$ output lines of register 76 will supply voltages representative of the instant states of their associated stages to the other input of AND gates 78.

As the pulses representative of the video field are shifted through register 76, at one instant the $n$ bits representative of the object will be present in register 76, causing its stages to be set identically to the stages of register 74. Every AND gate 78 will receive like inputs (a ONE or ZERO) and thus the full complement of $n$ inputs will be supplied to voltage adder 80.

At all other times when the instant set of $n$ bits present in register 76 are not representative of the entire object, but rather only a part thereof or other background of the video scene, it will be apparent that the stages of register 76 will not be set similar to register 74, and consequently less than all $n$ AND gates will supply an output to adder 80.

The output of adder 80, known as the correlation function, will be an irregular waveform with a maximum or pronounced peak at that instant when all $n$ inputs are supplied thereto, which is when the part of the video field encompassing only the reference object is present in register 76. The location or displacement of this peak in the correlation function is proportional to the distance to the object from minimum range (1).

Peak locator

Units 84, 90, 88, 96, 94, 100, 102, and 26 together constitute the peak locator with units 84, 90, and 88 constituting an increasing peak detector 92. The peak locator functions to locate the maximum peak of the correlation function in terms of the number of clock pulses generated since the mechanism was started, and then translate said number into range units.

Increasing peak detector 92 produces a pulse on line 86 each time the correlation function contains a peak greater than any previous peak. The balance of the peak locator functions to store the instantaneous count each time the increasing peak detector produces a pulse. When scansion is entirely completed the last count stored is translated to range units and read out. The first $n$ counts supplied to the peak locator are not representative of any range but merely scansion of the left or reference field. Only thereafter is the number of counts supplied before the highest peak occurs proportional to the range to the object. Therefore the peak locator is arranged to disregard the first $n$ counts. This can be accomplished by either: (1) presetting counter 96 to ignore the first $n$ counts and thus produce its first output at a count of $n+1$, or (2) arranging readout unit 26 to ignore the first $n$ counts when translating them into a range indication.

The increasing peak detector 92 operates as follows:

Comparator 84 will produce an output pulse when voltage first appears on line 82 since the $b$ input thereof will not be energized with any voltage at this time. This first voltage appearing on line 82 will be sent through gate 90 and will be stored by unit 88 and applied to the $b$ input of comparator 84. The output 86 of comparator 84 will terminate since its $a$ input will be equal to and hence no longer greater than its $b$ input.

If a larger voltage subsequently appears on line 82 owing to a subsequently greater value in the correlation function, another pulse will be produced on line 86 in similar fashion. A pulse will appear on line 86 each time a peak greater than any previous peak appears. The last pulse on line 86 (which also may be the first and only pulse) will represent the occurrence of highest peak in the correlation function.

Meanwhile clock counter 96 has been counting the pulses supplied by generator 68 and continuously translating said count into a parallel binary readout form.

Each time increasing peak detector 92 produces a pulse, gate 94 will be energized and the instant binary count readout of counter 96 will be fed to position register 100 for storage. The last count stored will represent the position of the highest peak and hence the location of the reference object in the video field.

After the counter 96 has received a preset number of pulses indicative of completion of scansion by shutter 44, line 98 will be energized causing gate 102 to transmit the last count stored in register 100 to be fed to unit 26. At the same time counter 76 will reset to zero. Unit 26 translates the last stored count into range units and provides a suitable range indication. The range indication translated by unit 26 is proportional to the count number, making allowance for the minimum range determinable by the rangefinder (i.e., point (1) in FIG. 1).

The correlator of FIG. 2 translated the video and reference signals into binary or two-level signals which were fed to registers 74 and 76. The subsystem shown in FIG. 3 is a multilevel correlator, i.e., a correlator which uses a number of levels greater than two. The multilevel correlator is far more sensitive than its binary counterpart; i.e., it produces a maximum peak in its correlation function which is far greater than any lesser peak therein. The subsystem of FIG. 3 may be directly substituted in the FIG. 2 system in lieu of units 70 and 72, registers 74 and 76, and AND gates 78.

In view of the greatly increased sensitivity of the multilevel correlator a far simpler peak locator may optionally be used. This simplified peak detector may include in lieu of the increasing peak detector a threshold arranged to pass any voltage above a predetermined level, above which only the increased correlation peak will lie.

Elements 100 and 102 may also be eliminated from the peak locator with the output of gate 94 connected directly to unit 26. Operation of this simplified peak locator is similar to the one shown in FIG. 2 except that the threshold peak detector (substituted for the increasing peak detector) will produce only one pulse per operation when the correlation peak occurs. This pulse will cause gate 94 to become transmissive and send the particular instantaneous count to unit 26 to read out in terms of range units.

Description

Samplers 104 and 106 are arranged to receive the video and reference signals from DC amplifiers 66 and 64 and clock pulses from generator 68. Recurrent samples are taken of the reference and video waves to produce two recurrent trains of amplitude modulated pulses.

Binary pulse height encoders 108 and 110 are analog to digital converters which receive the trains of variable-amplitude pulses from samplers 104 and 106 and convert each pulse to a binary code which is read out in parallel fashion. More particularly the amplitude of each input pulse received by each encoder is measured in terms of a number of arbitrarily defined units. The amplitude in units of each pulse is represented in code form by two-level voltage (ONES and ZEROS) present on the parallel outputs of each encoder. Each output is representative of a number of amplitude units defined by sequential powers of 2, i.e., $2^0$ (=1), $2^1$ (=2), ..., $2^m$. The sum of the amplitude units represented by those outputs supplying binary ONES will equal the height of the contemporaneously encoded input pulse. For instance if a 5 unit input pulse is supplied, and $m=6$ (i.e. the encoders have 6 outputs), the outputs of the encoder will read "000101" i.e..

$$0 \times 2^5(=0) + 0 \times 2^4(=0) + 0 \times 2^3(=0)$$
$$+ 1 \times 2^2(=4) + 0 \times 2^1(=0) 1 \times 2^0(=1) = 5$$

The maximum possible height of the input pulses to each encoder should be equal to the number of units represented by the encoder's outputs when all ONES are present at its output. This number, equal to $2^m-1$, is called the quantization figure. If $m=6$ (i.e., the encoders have 6 outputs), the input pulses will be quantized into 63 units of amplitude.

Shift registers $112^0$, $112^1$, ... $112^m$ are each identical to shift register 76 in FIG. 2. Each shift register receives the bits (ONES and ZEROS) from the associated output of encoder 108 and is also coupled to the clock pulse generator 68, the pulses from which will continuously shift the ONES and ZEROS through each register, similar to the operation of register 76 in the FIG. 2 system.

Storage registers $114^0$, $114^1$, ... $114^m$ are each identical to storage register 74 in FIG. 2. Each storage register 114 receives the bits from the associated output of encoder 110 and shift pulses from generator 68. Each storage register and each shift register has $n$ stages. Each output of encoder 110 will supply $n$ bits (representative of the reference field) which will be shifted through its associated storage register until it is filled. Thereafter the storage registers will supply binary voltages on their output lines representative of the stored information.

AND gates 116 each have two inputs, one connected to the output of one stage of one of shift registers 112 and the other connected to the output of a corresponding stage of the corresponding one of storage registers 114. Thus AND gate 116-0-1, for example, has inputs from stage 1 of shift and storage registers $112^0$ and $114^0$; AND gate 116-$m$-$n$ has inputs from stage $n$ of shift and storage registers $112^m$, and $114^m$. AND gates 116 are arranged in $n$ groups, each group containing $m$ gates and having inputs from the same numbered stage of the shift and storage registers. Each AND gate 116 will provide a binary ONE output when both of its inputs are alike (ONES or ZEROS).

AND gates 118 are numbered from 118-1 to 118-$n$. Each AND gate 118 has $m$ inputs connected to the $m$ outputs of each group of AND gates 116. Each AND gate 118 will provide a binary ONE output only when all of its inputs are binary ONES. The outputs of AND gates 118 are connected to an $n$ input voltage adder identical to adder 80 in FIG. 1. The output of the adder may be connected to a peak locator identical to that shown in FIG. 1 or a simple threshold-type peak locator as aforediscussed.

Operation

The analog signal from amplifier 64 of FIG. 2, derived from scansion of the left or reference field will be applied to sampler 106 of FIG. 3 where it is sampled at the rate of the clock pulses from generator 68 to produce analog (variable amplitude) sample pulses. Approximately $n$ pulses will be produced for each operation.

Each analog pulse will be converted by encoder 110 into a parallel group of $m$ simultaneously occurring digital bits, respectively supplied on the $m$ output leads of the encoder. Encoder 110 will supply $n$ such groups to fill storage register 114 similar to the manner in which storage register 74 in FIG. 1 was filled. The $n$ outputs of each register 114 will then supply to AND gates 116 binary voltages representative of the characteristics of the reference field.

Thereafter the analog signal from amplifier 66 of FIG. 2 derived from scansion of the right or video field, will be applied to sampler 104 of FIG. 3 where analog sample pulses will be derived and fed to encoder 108. Encoder 108 will produce a simultaneous group of digital bits in response to each analog pulse. The $m$ bits of each group will be supplied, respectively, on outputs leads $2^0$ to $2^m$ and applied to shift registers $112^0$ to $112^m$, respectively. These bits will be shifted through registers 112 similar to the manner in which shift register 76 of FIG. 1 was operated. Each of the $m \times n$ outputs of registers 112 will supply to its associated AND gate 116 a series of bits representative of one part of the binary code derived from scansion of the video scene.

At one instant in the interval when the bits representative of the video scene are passed through the shift registers for comparison with the stored bits representative of the "object" part of the video scene, the information stored in the shift registers will be identical to that stored in the storage registers. This, of course, occurs when that part of the viedo scene which includes only the object is present in the shift registers in bit form. At this instant, the stages of each shift register will be set identically with the corresponding stages of each corresponding storage register.

Thus, also at this instant, all $m \times n$ AND gates 116 will provide an output since the both inputs of each will be connected to stages in identical states.

All of the inputs of each AND gate 118 will now be energized, causing all the $n$ outputs of AND gates 118 to all be energized. Voltage adder 80 now will supply a relatively high voltage: this is the peak of the correlation function.

At all other instants during the interval when the encoded video signal is passed through the shift registers and compared with the binary information representative of the reference information stored in the storage registers, there will be a very slight probability that all of the AND gates 116 in any group will be energized. Hence few or none of the AND gates 118 will provide an output and the output from adder 80 will be absent or very low. Therefore the multilevel correlator will provide a far more pronounced correlation peak than its binary counterpart.

The operation of both the multilevel and digital correlators has been described in terms whereby the peak of the correlation function occurred when the states of all the stages of the shift register(s) exactly matched the states of all the stages of the storage register(s). In practice this ideal match of all stages may not occur due to imperfections, transients, etc., in the system, but it will be appreciated that the correlation function will still have a pronounced peak when the object part of the video field is located in the shift registers since there will be a greater degree of match at this instant than at any other.

The instant invention is not limited to the specificities of the foregoing description since many modifications thereof which still fall within the true scope of the inventive concept will be apparent to those conversant with the art. The invention is defined only by the appended claims.

We claim:

1. An automatic optical-electronic rangefinder for measuring the distance from a base line to a distant object, comprising:
   (a) means for producing a first group of binary bits representative of the video scansion characteristics of said object as seen from a first point on said base line and a second and longer group of binary bits representative of the video characteristics of said object plus its surroundings as seen from a second point on said base line
   (b) means for correlating said first and second groups of binary bits to produce a correlation signal having a peak whose temporal displacement from its beginning corresponds to the location in said longer group of binary bits of the binary bits representative of said object, and hence the range to said object, and
   (c) means for translating the displacement of said peak into units of range.

2. The rangefinder of claim 1 wherein said means (b) includes:
   (a) a storage register arranged to receive said first group of binary bits in serial form and supply them in parallel to respective first inputs of a plurality of AND gates,
   (b) a shift register arranged to receive said second group of binary bits in serial form and supply them in parallel to second inputs of said AND gates in successive fashion, and
   (c) a voltage adder having a plurality of inputs coupled to the outputs of said AND gates.

3. The rangefinder of claim 1 wherein said (a) means is arranged to provide two serial groups of analog samples, respectively representative of the video scansion characteristics of the said object and said object plus its surroundings as seen from said first and second points on said base line, respectively, and wherein said first and second groups of binary bits consist of first and second binary signals representative of said first and second groups of analogs samples, respectively, and wherein said (b) means comprises:
   (a) a plurality of identical storage registers arranged to receive said first parallel binary signal and supply the bits thereof to respective first inputs of a first group of AND gates,
   (b) a corresponding plurality of identical shift registers arranged to apply said second parallel binary signal and supply the bits thereof to second inputs of said first group of AND gates in successive fashion, the outputs of corresponding stages of corresponding shift and storage registers being connected to the same AND gates, and
   (c) a second group of AND gates and a voltage adder having a plurality of inputs coupled to the outputs of said second group of AND gates, the outputs of those AND gates of said group which are connected to corresponding stages of said shift and storage registers being connected to individual ones of said second group of AND gates.

4. An automatic rangefinder, comprising:
   (a) means for providing a first bilevel signal of relatively short duration whose characteristics are representative of scansion of a distant object as viewed from a first point on a base line,
   (b) means for providing a second bilevel signal of relatively long duration whose characteristics are representative of scansion of a distant object and its surroundings as viewed from a second point on said base line,
   (c) means for deriving a correlation signal continuously representative of the degree of correlation between every portion of said second signal equal in size to said first signal with said first signal, and
   (d) means for providing a range indication proportional to the temporal displacement of the highest peak in said correlation signal from the beginning of said correlation signal.

5. The combination of claim 4 wherein said means under clause (d) includes:
   (1) an increasing peak detector for providing a pulse whenever a peak greater than any previous peak appears in said correlation signal, said increasing peak detector comprising:
       (a) means for storing a voltage applied thereto,
       (b) a normally nontransmissive gate having an interrogate input, a signal input supplied with said correlation signal, and an output connected to said means for storing, said gate being arranged to supply said correlation signal to said means for storing when its interrogate input is energized, and
       (c) a voltage comparator coupled to an output of said means for storing and supplied with said correlation signal and arranged to provide a pulse and energize said interrogate input when the amplitude of said correlation signal is greater than the voltage stored in said means for storing; and
   (2) means for indicating in terms of range units when the last pulse from said increasing peak detector has been supplied, comprising:
       (a) means for (1) providing a binary numerical indication representative of the instantaneous elapsed duration of said correlation signal and (2) energizing an output lead when said correlation signal has terminated,
       (b) means for transmitting the instant numerical indication supplied by said last named means to a storage register whenever said increasing peak detector supplies an output pulse,
       (c) means for transmitting the instant numerical indication stored in said storage register to an indicator arranged to translate said numerical indication into units of range when said output lead is energized.

6. An automatic rangefinder comprising:
   (a) means for producing a first electrical signal representative of the characteristics of a restricted field as viewed from a first point on a base line,
   (b) means for translating said first electrical signal into a first bilevel signal, one level of which is representative of one characteristic of said first signal, and the other level of which is representative of another characteristic of said first signal,
   (c) means for sampling said bilevel signal to provide a relatively small group of binary pulses,
   (d) means for storing said small group of binary pulses by providing a corresponding group of continuous binary voltages representative of said pulses,
   (e) means for producing a second electrical signal, temporally longer than said first signal, and representative of the characteristics of a wide field, encompassing said restricted field, as viewed from a second point on said base line,
   (f) means for translating said second electrical signal into a second bilevel signal, related to said second electrical signal as said first bilevel signal is related to said first electrical signal,
   (g) means for sampling said second bilevel signal to provide a relatively large group of binary pulses, (h) means for (1) producing from said large group of binary pulses a corresponding group of binary voltages and (2) continuously comparing said group of binary voltages with said small group of binary voltages to provide a correlation signal continuously indicative of the degree of correlation of every portion of said large group of voltages, which is equal in size to said small group of voltages, with said small group of voltages, and (i) means for indicating the temporal displacement from the beginning of said correlation signal of a highest peak therein in units or range.

7. A rangefinder for automatically indicating the range from a base line to a distant object comprising:

(a) an optical system for providing two fields of view, one relatively narrow and determined from a first point on said base line, and the other relatively wide, encompassing said first field for a given range interval and determined from a second point on said base line, said optical system including an auxiliary viewfinder arranged to enable an observer to see said narrow field of view therethrough, (b) translating means including at least a shutter and two photocells arranged to effect point by point scansion of a straight line across said narrow and wide fields in sequence to provide first and second sequential video signals whose instantaneous amplitude is proportional to the light intensity of the scanned points of said fields, (c) means for differentiating, clipping, and clamping said first and second video signals to provide first and second bilevel signals whose level transitions correspond temporally to slope changes in said video signals, (d) means for providing a train of synchronizing pulses starting with the beginning of scansion of said narrow field and terminating when scansion of said wide field is terminated, (e) means for providing in response to said bilevel signals and said train of synchronizing pulses, sampled versions of said first and second bilevel signals comprising first and second binary pulse trains, each consisting of alternate groups of bilevel signal pulses, (f) a storage register arranged to receive said first pulse train and supply on a plurality of output leads constant bilevel voltages corresponding to said bilevel signal pulses in said first pulse train, (g) a shift register having a plurality of output leads corresponding to the output leads of said storage register and arranged to receive said second pulse train and supply to each of its output leads in sequence bilevel voltages corresponding to said bilevel signal pulses of said second pulse train, (h) a plurality of two-input AND gates, each arranged to provide a signal output when both of its inputs receive like bilevel voltages, one input being connected to one output lead of said storage register and the other input being connected to the corresponding output of said shift register, (i) a voltage adder arranged to receive the outputs of all of said AND gates and supply an output signal proportional in magnitude to the number of AND gates which supply signal outputs, and (j) a peak locator arranged to count said synchronizing pulses and translate the count occurring simultaneously with the highest peak in the output of said adder into an indication of range.

8. The rangefinder of claim 7 where said peak locator comprises:

(a) a gate having an interrogate input, a signal input and an output, and arranged to be rendered transmissive when its interrogate input is energized, the signal input of said gate being connected to the output of said adder, (b) means arranged to store the output of said gate, (c) means arranged to compare the stored outputs of said gate with the instantaneous output of said adder and temporarily energize the interrogate input of said gate when the output of said adder is greater than said stored output, (d) a counter arranged to provide a binary count output continuously indicative of the member of synchronizing pulses generated, (e) a gate arranged to transmit said binary count output to a register whenever the interrogate input of said gate recited under clause (a) is energized, said register arranged to store said count until a new output is supplied thereto, (f) another gate arranged to transmit the count stored in said register to a range computer and output indicator after scansion of said wide field is completed, said range computer and output indicator arranged to translate said count into units of range on an indicator.

9. A rangefinder for automatically indicating the range from a base line to a distant object comprising:

(a) an optical system for providing two fields of view, one relatively narrow and determined from a first point on said base line, and the other relatively wide, encompassing said first field for a given range interval and determined from a second point on said base line, said optical system including an auxiliary viewfinder arranged to enable an observer to see said narrow field of view therethrough, (b) translating means including at least a shutter and two photocells arranged to scan point by point along a line across said narrow and wide fields in sequence to provide first and second sequential video signals whose instantaneous amplitude is proportional to the light intensity of the scanned points of said fields, (c) means for providing a train of synchronizing pulses beginning with scansion of said narrow field and terminating with scansion of said wide field, (d) means for providing, in response to said synchronizing pulses and said video signals, sampled versions of said video signals comprising first and second trains of variable amplitude pulses, (e) means for encoding each of said trains of variable amplitude pulses in binary form, whereby in response to each pulse in each train a simultaneously-occurring group of bilevel voltages, aggregatively indicative of the height of each pulse, are supplied on a corresponding group of output leads, (f) a plurality of storage registers, connected respectively to those output leads arranged to supply the groups of bilevel voltages indicative of the height of said first train of variable amplitude pulses, and arranged to store the sequential groups of said bilevel voltages representative of said first train and hence representative of the signal generated by scansion of said narrow field, (g) a plurality of shift registers connected respectively to those output leads arranged to supply the groups of bilevel voltage indicative of the height of said second train of variable amplitude pulses, and arranged to continuously shift therethrough sequential groups of bilevel voltages representative of said second train and scansion of said wide field, (h) a plurality of first AND gates, each having a first input connected to one stage of one of said storage registers, and a second input connected to a corresponding stage of a corresponding one of said shift registers, said first AND gates arranged to supply a signal output if both of its inputs receive like binary voltage inputs, (i) a plurality of second AND gates, each having inputs connected to the outputs of all those first AND gates connected to corresponding stages of said shift and storage registers, (j) a voltage adder arranged to receive the outputs of all of said second AND gates and supply an output proportional in magnitude to the number of second AND gates whose entire complement of inputs are energized, and (k) a peak locator arranged to count said synchronizing pulses and translate the count occurring with the highest peak in the output of said adder for a particular operation into an indication of range.

References Cited

UNITED STATES PATENTS

| 3,023,966 | 3/1962 | Cox et al. | 235—181 |
| 3,036,775 | 5/1962 | McDermid et al. | 235—165 |
| 3,171,126 | 2/1965 | Wiley | 343—112 |
| 3,180,205 | 4/1965 | Heppe et al. | 88—1 |

MALCOLM A. MORRISON, *Primary Examiner.*

MARTIN P. HARTMAN, *Examiner.*